(12) United States Patent  (10) Patent No.: US 7,644,940 B2
Bless et al. (45) Date of Patent: Jan. 12, 2010

(54) PROGRESSIVE TRANSMISSION MECHANISM

(76) Inventors: Werner M. Bless, Weidstrasse 33, CH-8808 Pfäffikon SZ (CH); Erwin Rott, Sonnenbühlweg 3, CH-8630 Rüti ZH (CH)

( * ) Notice: Subject to any disclaimer, the term of this patent is extended or adjusted under 35 U.S.C. 154(b) by 395 days.

(21) Appl. No.: 10/556,156

(22) PCT Filed: May 11, 2004

(86) PCT No.: PCT/EP2004/005044

§ 371 (c)(1),
(2), (4) Date: Feb. 2, 2007

(87) PCT Pub. No.: WO2004/102039

PCT Pub. Date: Nov. 25, 2004

(65) Prior Publication Data

US 2008/0105486 A1 May 8, 2008

(30) Foreign Application Priority Data

May 15, 2003 (CH) .................................. 0859/03

(51) Int. Cl.
*B60G 7/06* (2006.01)
(52) U.S. Cl. ............................ 280/93.502; 280/93.506; 280/93.509; 280/93.51; 280/93.513

(58) Field of Classification Search ............ 280/93.502, 280/93.514, 93.513, 93.506, 93.509, 93.51
See application file for complete search history.

(56) References Cited

U.S. PATENT DOCUMENTS 5,527,053 A * 6/1996 Howard ........................ 280/90
7,258,364 B2 * 8/2007 Bless et al. .................. 280/771

* cited by examiner

*Primary Examiner*—Eric Culbreth
(74) *Attorney, Agent, or Firm*—Darby & Darby PC; Robert J. Sacco

(57) ABSTRACT

The invention relates to a transmission mechanism (20) of a progressive gear (1), especially a steering gear for a vehicle, comprising a seating for each of an input shaft (10) and an output shaft (30). The transmission mechanism (20) according to the invention consists of a movable coupler (21) which is in articulated connection with the input shaft (10) and the output shaft (30) so that transmission from the input shaft (10) to the output shaft (30) with a progressive characteristic is achieved in the range −180° to +180°. The advantage of such a gear (1) lies in the simple and therefore economical production of the apparatus and in its low space requirement. The absence of play in the mechanism and the direct transmission of forces by virtue of the individual components having suitable angles with respect to one another are further advantages.

20 Claims, 4 Drawing Sheets

US 7,644,940 B2

PROGRESSIVE TRANSMISSION MECHANISM

CROSS REFERENCES TO RELATED APPLICATIONS

This application is a national phase application under 35 USC §371 of application Ser. No. PCT/EP2004/005044 filed May 11, 2004, which claims the benefit of Swiss patent application serial number 20030859-03 filed May 15, 2003.

BACKGROUND OF THE INVENTION

1. Field of the Invention

The invention relates to a transmission mechanism of a progressive gear, especially a steering gear for a vehicle, comprising a seating for each of an input shaft and an output shaft.

2. Description of the Related Art

Progressive gears are widely used. One of the most important applications consists of steering gears of all kinds, but principally steering gears of controlled transport means of all kinds, for example steering gears of vehicles.

A gear is an apparatus for transmitting or converting movements. Of interest herein are gears which convert a rotary movement of an input shaft into a rotary movement of an output shaft. In the case of a steering gear of a vehicle, the input shaft is directly or indirectly coupled to a steering wheel whereas the output shaft is coupled to a suitable mechanism which brings about a change in the direction of the vehicle to be steered. In the case of rack-and-pinion steering, such mechanisms customarily comprise a pinion, which is coupled to the output shaft, and a toothed rack, in which the pinion engages. When the steering wheel is turned, the rack is moved and, by means of track rods, turns the wheels that are being steered. Other examples of those mechanisms include, inter alia, cam-and-roller steering arrangements and recirculating ball steering arrangements.

In contrast to gears which have a linear relationship between the input shaft and the output shaft, progressive gears have a non-linear relationship between the rotation of the input shaft and the rotation of the output shaft. Using the example of a vehicle, the effect of turning the steering wheel through a particular angle is accordingly dependent on the position of the steering wheel at that moment. Advantageously, that effect is small when the steering wheel is in the straight-ahead position and becomes larger the further the steering wheel has been turned. At high speeds this ensures precise steering around the straight-ahead position because even a relatively large movement of the steering wheel gives rise to just a small change in the direction of travel. On the other hand, during maneuvering, once the steering wheel has been turned to a large extent, just a small rotational movement of a progressive steering mechanism will give rise to a relatively large change in driving direction. This is desirable, in particular when parking, in order to be able to change efficiently from one wheel lock position to the other.

EP 0 915 003 B1 (Wandfluh) puts forward a vehicle steering device having a variable transmission ratio, comprising a total of four axes of rotation all intersecting at a single point. The disadvantage of that recirculating ball steering device lies in the fact that the levers are not located in a plane but at steep angles to one another. This technically awkward and unstable arrangement is sensitive to tolerances and requires a high outlay on the accuracy of the parts in order not to have too much play. This results in high assembly costs because the bearings have to be precisely adjusted at great expense. As a result of the steepness of the recirculating ball steering device, the steering sensitivity is reduced because the feel for the steering is lost through the balls of the radial steering. The relatively dead steering in the region of straight-ahead driving changes rather abruptly, on turning the steering wheel through about 75°, to highly progressive steering, as can be seen from FIG. 6 of the mentioned specification. From the same figure it can also be seen that the maximum possible turning angle of the steering wheel is limited to 105° on each side, which is a further disadvantage of that arrangement because the entire steering range has to be covered in just 210°.

The specification DE 195 19 588 A1 (Honda) puts forward a further steering gear having a progressive characteristic. The variability of the transmission ratio in that steering gear is based on the fact that although the output shaft of the steering gear extends parallel relative to its input shaft it is arranged offset therefrom (eccentrically). For coupling the input shaft to the output shaft an intermediate element is arranged between the two shafts which basically has the function of a slider crank (a prismatic joint combined with a revolute joint) and transmits the torque from the input shaft—or from an extension connected to the input shaft so that it rotates together therewith—to the output shaft. The effect of a steering gear of such a kind does indeed tend in the desired direction because the steering response increases in a harmoniously progressive manner with increased turning of the steering wheel; however, it would be desirable for that characteristic to be more pronounced. This cannot be achieved using the technical arrangement put forward in the mentioned specification because in achieving that low degree of progression the technical outlay required for ensuring play-free behaviour is already prodigious.

EP 0 915 003 B1 gives an extensive list containing further known proposals for progressive steering gears together with the various technical arrangements and their shortcomings.

SUMMARY OF THE INVENTION

A problem addressed by the present invention is to provide a transmission mechanism of a progressive gear, preferably as a steering device for a vehicle, which transmission mechanism is distinguished by the fact that it is not sensitive to tolerances. Another problem addressed by the invention is to provide a transmission mechanism of a progressive gear that operates without play without requiring adjustments. Yet another problem addressed by the invention is to provide a transmission mechanism of a progressive gear that has an advantageous relationship of forces. In addition, a progressive characteristic that is as even as possible is desirable, the ratio of steering angle to driving angle decreasing about fivefold from straight-ahead driving to the full lock region. The arrangement should be space-saving and shallow.

The above problems are solved, wholly or at least in part, by a transmission mechanism of a progressive gear, comprising a seating for each of an input shaft and an output shaft, wherein an input articulation is provided at the seating for the input shaft offset from its axis by an input offset, wherein an output articulation is provided at the seating for the output shaft offset from its axis by an output offset, wherein said articulations are in articulated connection with one another at a fixed coupling spacing from one another by means of exactly one coupler, and wherein the axes of the input shaft and of the output shaft extend mostly parallel to one another at a fixed axial offset.

The solution is provided by a single coupler which is crankwise connected both to the input shaft and to the output shaft so as to be rotatable on bearings. By suitably selecting the spacing of the bearings on the coupler and the offset of the bearings relative to the axes of the shafts, the progressive characteristic can be modulated as required. The entire progression is passed through in a revolution of the input shaft from −180° to +180°. The transmission is not entirely symmetrical on turning anticlockwise and clockwise but surprisingly that does not have a troublesome effect on the steering behaviour.

The transmission mechanism can be accommodated in a panel because all the movements of the transmission mechanism take place in a plane.

The advantage of such a gear lies in the simple and therefore economical production of the apparatus and in its low space requirement. The absence of play in the mechanism and the direct transmission of forces by virtue of the individual components having suitable angles with respect to one another are further advantages.

BRIEF DESCRIPTION OF THE DRAWINGS

The invention will be described in greater detail hereinbelow with reference to the drawings, in which.

DETAILED DESCRIPTION OF THE EXEMPLARY EMBODIMENTS

Figure 1:
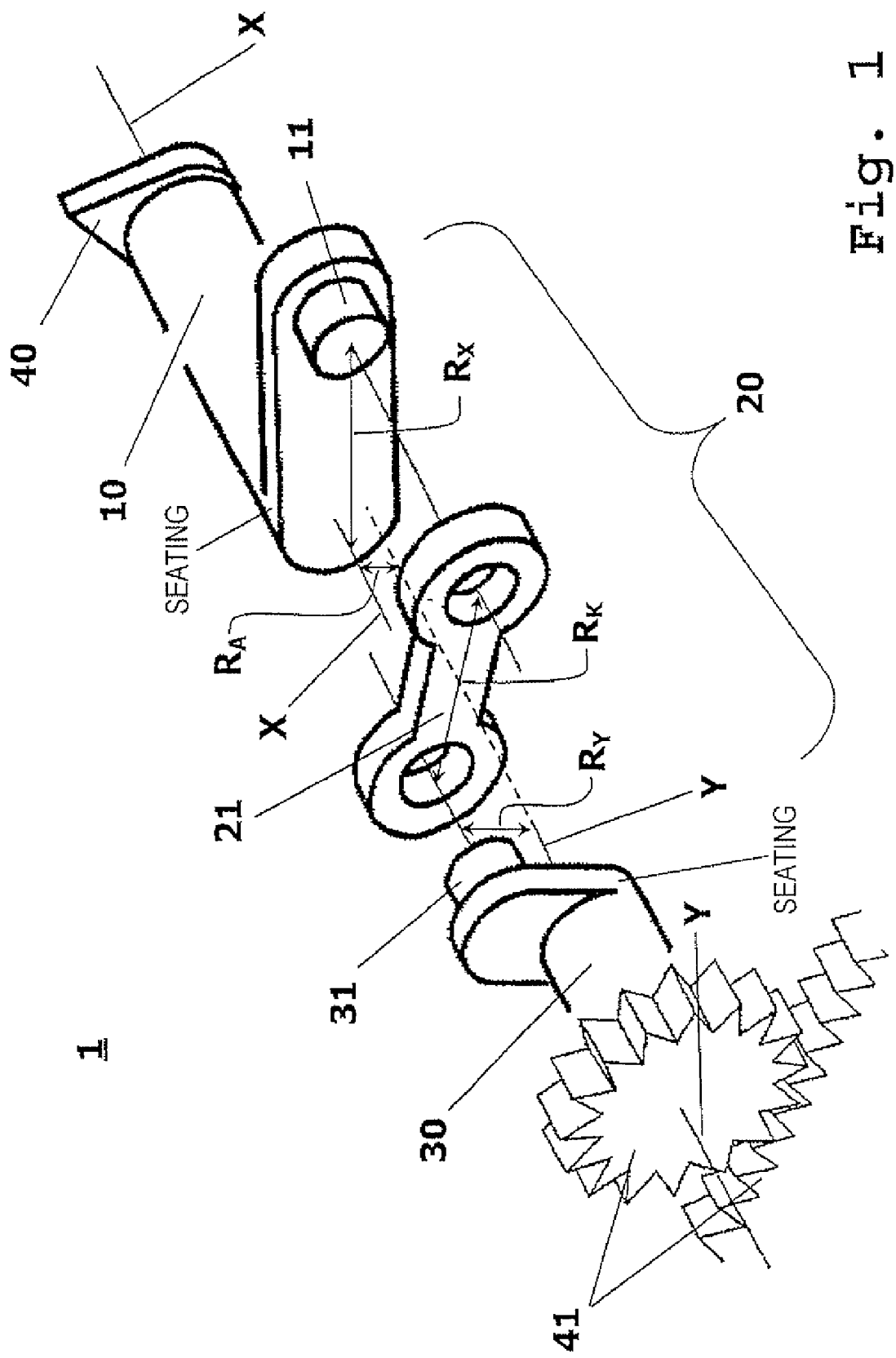
FIG. 1 is an exploded perspective view of an exemplifying embodiment.

FIG. 1 shows an input shaft 10 having an axis X and an output shaft 30 having an axis Y, the two axes X, Y extending substantially parallel with an axial offset $R_A$ relative to one another. Arranged between the two shafts is a transmission mechanism 20, which brings about a progressive characteristic of the output shaft 30 on rotation of the input shaft 10.

Provided on the input shaft 10, offset by an input offset $R_X$ from the axis X of the input shaft 10, is an input articulation 11. Provided on the output shaft 30, offset by an output offset $R_Y$ from the axis Y of the output shaft 30, is an output articulation 31. Those two articulations 11, 31 are located at a fixed coupling spacing $R_K$ from one another. This is achieved by a coupler 21, which connects those articulations 11, 31 to one another at the desired spacing so that they can rotate. The articulations 11, 31 allow movements only in a plane perpendicular to the axes X and Y.

The coupler 21 consists of a single part and is preferably of a shallow shape. Bearings used in the articulations 11, 31 can be antifriction bearings, especially needle bearings, or plain bearings, or any equivalent solution known to persons skilled in the art can be applied.

In FIG. 1, the steering wheel 40 is shown in diagrammatic form on the input shaft 10. A pinion and rack 41 are shown, also in diagrammatic form, on the output shaft 30. However, the drawing should on no account be given a limiting interpretation.

The proportioning of the four dimensions with respect to one another, namely the axial offset $R_A$, the input offset $R_X$, the output offset $R_Y$ and the coupling spacing $R_K$, is crucial. First of all it must be ensured that the complete mechanical rotation of the transmission mechanism 20 can be accomplished. A further requirement consists of optimum force transfer from the input shaft 10 to the output shaft 30. For that purpose, the angle α, which is produced by the straight portions in which $R_K$ and $R_Y$ are located, should, as far as possible, vary in the region about 90°. The angle α should accordingly always be between 40° and 135°.

In order to meet those requirements, the proportions are defined so that the ratio of the axial offset $R_A$ to the input offset $R_X$ is at least between 1:10 and 4:10, preferably between 1.8:10 and 3:10. In addition, the ratio of the output offset $R_Y$ to the input offset $R_X$ should be at least between 2:10 and 7:10, preferably around 5:10. The ratio of the input offset $R_X$ to the coupling spacing $R_K$ should be at least between 7:10 and 13:10, preferably around about 1:1.

A preferred embodiment has, for example, the following dimensions:

|  | Advantageous range (mm) | Advantageous narrower ange (mm) | Preferred example (mm) |
|---|---|---|---|
| Axial offset $R_A$ | 4-20 | 6-10 | 7 |
| Input offset $R_X$ | 20-80 | 25-50 | 34 |
| Output offset $R_Y$ | 10-40 | 12-20 | 15 |
| Coupling spacing $R_K$ | 20-80 | 25-50 | 33 |

The gear 1 can also be achieved using other measurements and dimensions of the components described, especially using a multiple of the example given. In the case of use of a steering arrangement for a vehicle, however, size is crucial because the space available in vehicles is usually very limited. The values given herein provide a good compromise between functional reliability of the gear and a space-saving size of construction.

All dimensions can differ from the above-mentioned ideal conditions, provided that mechanical rotation remains possible. Even though the force transfer properties will then no longer be optimal, other dimensions and proportions can be advantageous in certain areas of use, for example in order to reduce the overall space requirement of the gear or to increase the lever action in certain positions of rotation.

Figure 2A:
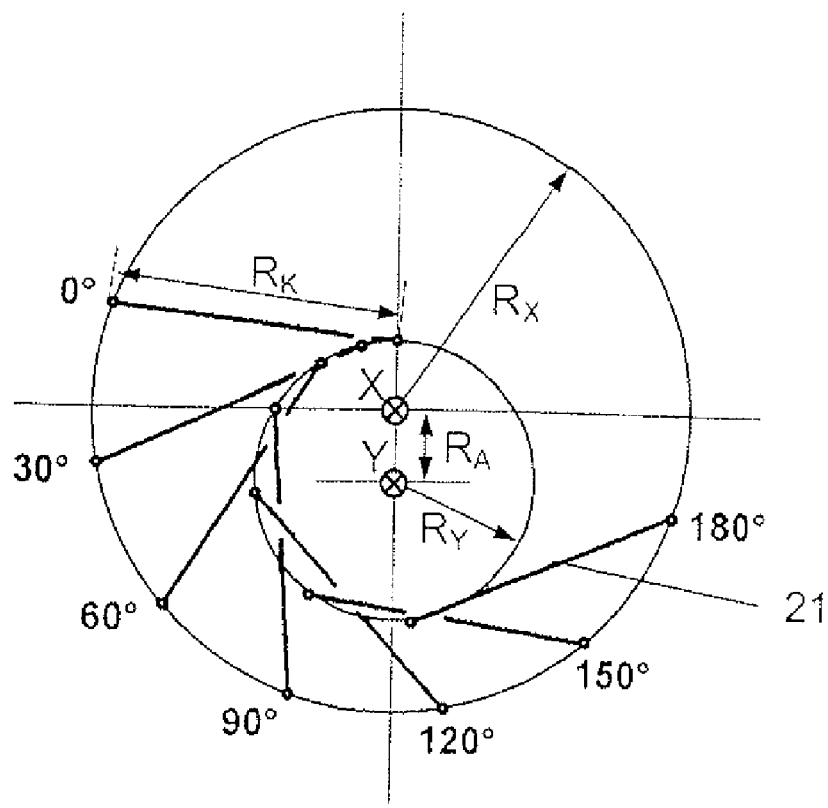
FIGS. 2a and 2b show various positions of the levers and of the couple in the course of a revolution of the steering wheel.
Figure 2B:
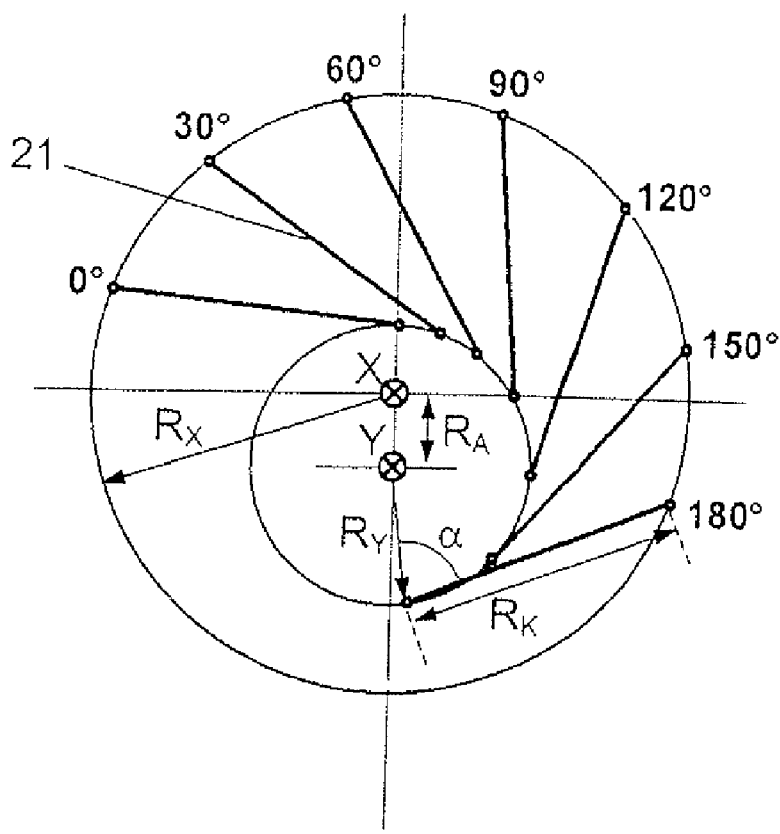

FIGS. 2a and 2b shows the various steering wheel positions with their effects on the output shaft 30. FIG. 2a describes anticlockwise rotation between 0 and 180°, and FIG. 2b corresponding clockwise rotation. The outer circle indicates the course of the input articulation 11, the inner circle the course of the output articulation 31 during a revolution. The connecting lines between the outer and inner circles indicate the coupler 21 in the positions in question.

Figure 3:
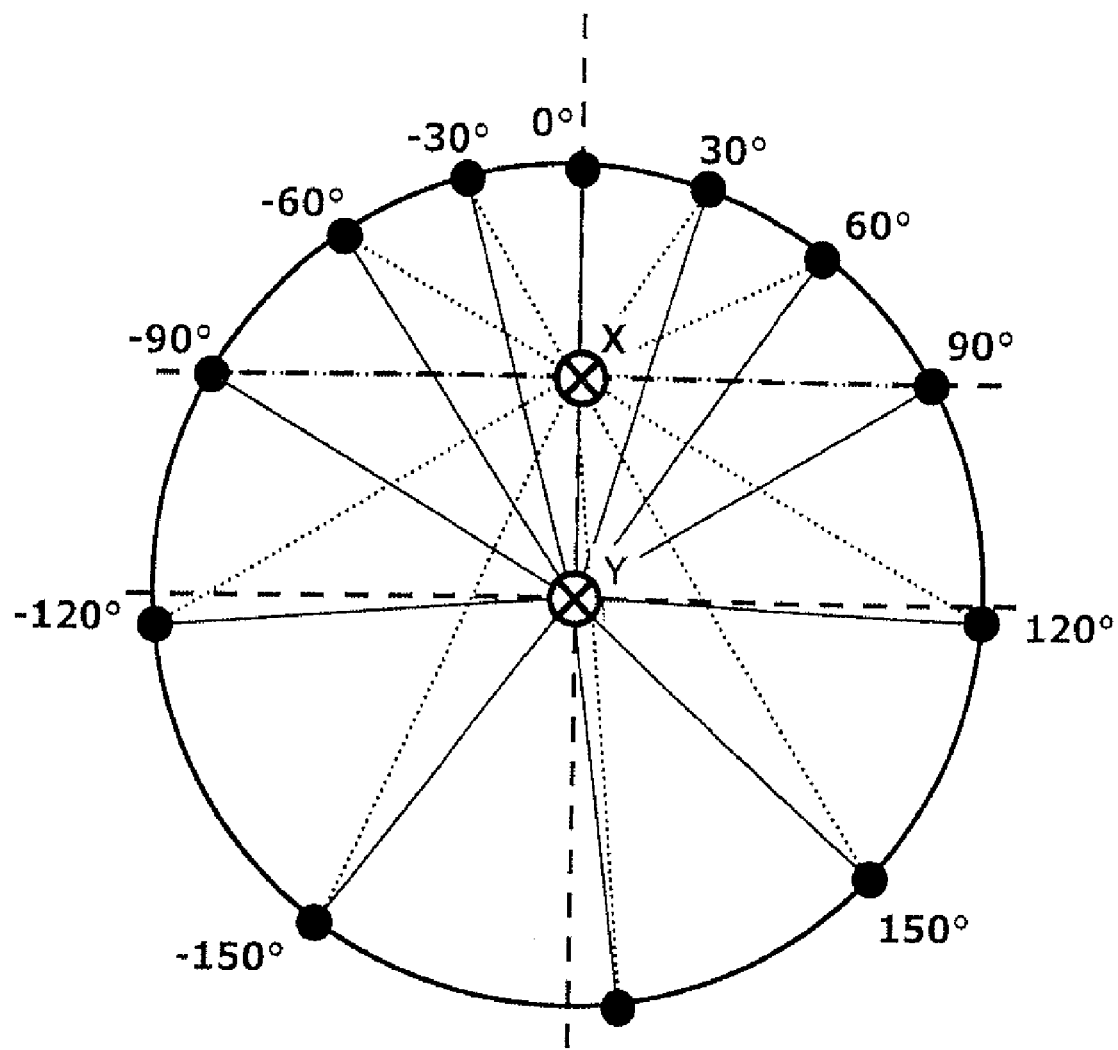
FIG. 3 shows various positions of the output articulation in the course of a revolution.

The progressive characteristic of the steering can be seen from FIG. 3. The circle shown describes the respective positions of the output articulation 31 in each of the indicated steering wheel positions.

From FIGS. 2a, 2b, and 3 it can be readily seen that the 180° position of the steering wheel results in just a small departure of the pinion from the ideal 180° position. In terms of driving performance, however, that departure is completely imperceptible. In this exemplifying embodiment, the symmetry of the steering during anticlockwise/clockwise rotation is very high considering the technical simplicity of the solution. A driver would immediately notice asymmetrical behaviour, particularly when steering a small way off from the straight-ahead position, and find it disturbing.

The axes X of the input shaft 10 and Y of the output shaft 30 do not necessarily have to be parallel. The use of spherical bearings can allow adjustment of the steering wheel angle. In that case, the data and spacings mentioned in this specification should be applied and derived analogously.

When using a transmission mechanism 20 in accordance with the invention it is feasible, in addition, for the rack and/or pinion 41 of a rack-and-pinion steering arrangement coupled to the gear 1 also to have a progressive arrangement in order to increase the progression by about a further 30-35%.

Use of one or two universal joints in the input shaft before the transmission mechanism additionally has a positive effect on the progressive characteristic.

The gear 1 described herein can be combined with any other kind of steering just as well as with a rack-and-pinion steering arrangement that is described herein. Customary measures such as power steering, intended collapsing points and every conceivable kind of steering system and also angular gears can be used in the same manner as hitherto.

Figure 4:
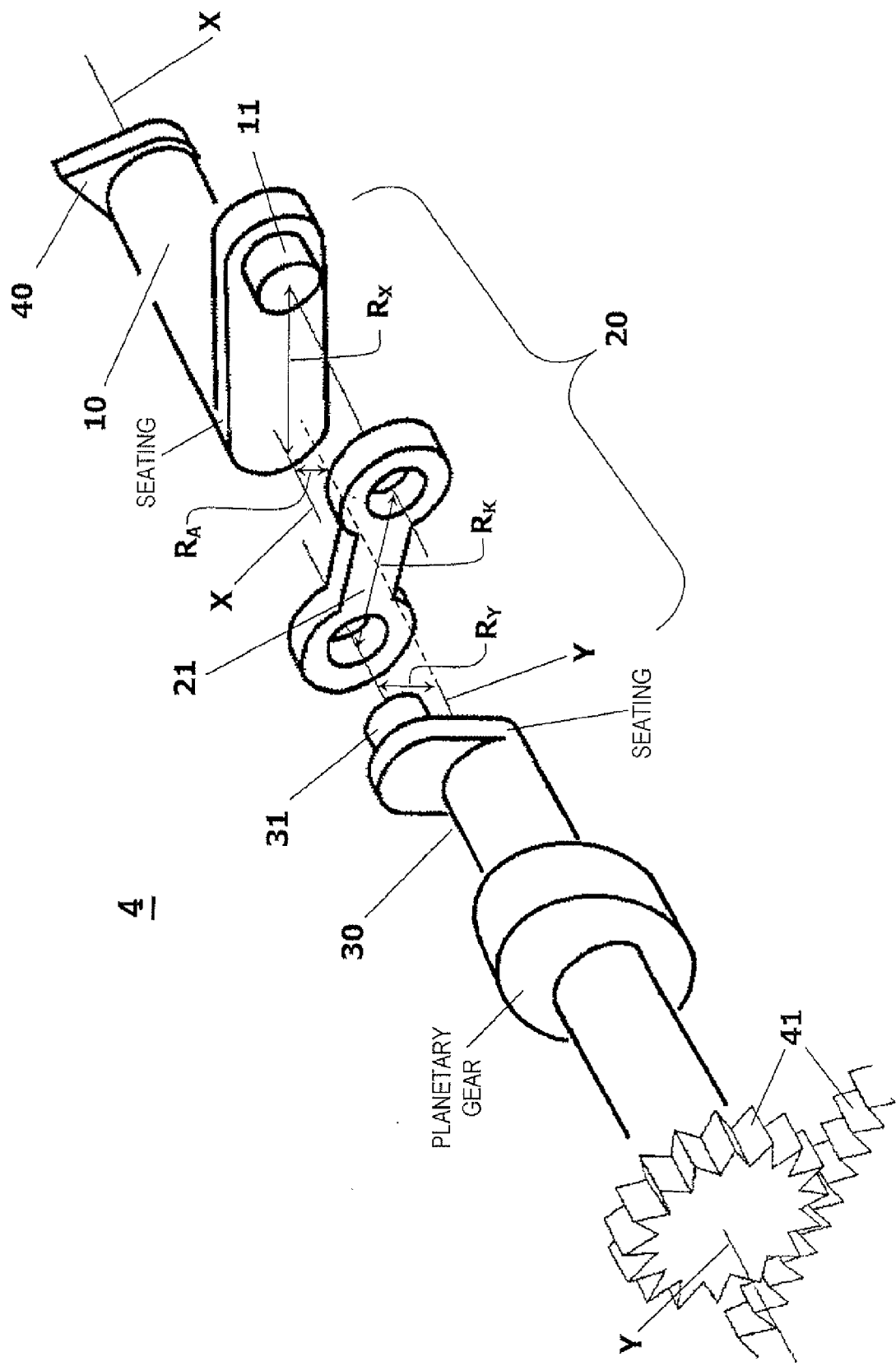
FIG. 4 shows an embodiment with a planetary gear.

Any customary vehicle can also be retrofitted with a suitable steering arrangement comprising a transmission mechanism 20 according to the invention. For example, in order to carry out adaptation to the existing pinion of a rack-and-pinion steering arrangement, there can be mounted on the output shaft 30 a planetary gear, as schematically shown in FIG. 4, which has the requisite gearing ratio in order to achieve the desired displacement of the rack on respective turning of the steering wheel from −180° to +180°.

Advantages of this transmission mechanism 20 according to the invention are the advantageous force relationship of the input shaft 10 with respect to the output shaft 30, the absence of play and of sensitivity to tolerances, the space-saving arrangement and also the simple and advantageous manufacture and assembly.

The particulars contained in the above description of sample embodiments should not be construed as limitations of the scope of the invention, but rather as exemplifications of preferred embodiments thereof. Accordingly, the scope of the invention should be determined not by the embodiments illustrated, but by the appended claims and their legal equivalents.

| List of references | |
|---|---|
| 1 | gear |
| 10 | input shaft |
| 11 | input articulation |
| 20 | transmission mechanism |
| 21 | coupler |
| 30 | output shaft |
| 31 | output articulation |
| 40 | steering wheel |
| 41 | pinion, rack |
| X | axis of input shaft |
| Y | axis of output shaft |
| $R_X$ | input offset |
| $R_Y$ | output offset |
| $R_A$ | axial offset |
| $R_K$ | coupling spacing |
| $\alpha$ | angle formed by the straight lines on which $R_K$ and $R_Y$ are located |

The invention claimed is:

1. A transmission mechanism of a progressive gear, comprising a seating for each of an input shaft and an output shaft, wherein an input articulation is provided at the seating for the input shaft offset from its axis by an input offset, wherein an output articulation is provided at the seating for the output shaft offset from its axis by an output offset, wherein said articulations are in articulated connection with one another at a fixed coupling spacing from one another by means of exactly one coupler, and wherein the axes of the input shaft and of the output shaft extend mostly parallel to one another at a fixed axial offset.

2. The transmission mechanism according to claim 1, wherein the progressive gear is a steering gear for a vehicle.

3. The transmission mechanism according to claim 1, wherein all length and spacing conditions are so selected that in the completely assembled state rotation of the input shaft and of the output shaft is mechanically possible.

4. The transmission mechanism according to claim 1, wherein the coupler has a substantially flat shape.

5. The transmission mechanism according to claim 1, wherein the ratio of the axial offset to the input offset is between 1:10 and 4:10.

6. The transmission mechanism according to claim 1, wherein the ratio of the axial offset to the input offset is between 1.8:10 and 3:10.

7. The transmission mechanism according to claim 1, wherein the ratio of the output offset to the input offset is between 2:10 and 7:10.

8. The transmission mechanism according to claim 1, wherein the ratio of the output offset to the input offset is about 5:10.

9. The transmission mechanism according to claim 1, wherein the ratio of the input offset to the coupling spacing is between 7:10 and 13:10.

10. The transmission mechanism according to claim 1, wherein the ratio of the input offset to the coupling spacing is about 1:1.

11. The transmission mechanism according to claim 1, wherein, in the course of the entire rotation, the angle between the straight line on which the coupling spacing is located and the straight line on which the output offset is located does not become more acute than 40° or more obtuse than 135°.

12. The transmission mechanism according to claim 1, wherein the input offset is between 20 and 80 mm.

13. The transmission mechanism according to claim 1, wherein the input offset is between 25 and 50 mm.

14. The transmission mechanism according to claim 1, wherein at least one of the input shaft and the output shaft is integrally formed with the corresponding seating.

15. The transmission mechanism according to claim 1, further comprising a planetary gear at the output shaft.

16. The transmission mechanism according to claim 1, wherein the ratio of the axial offset to the input offset is between 1:10 and 4:10, the ratio of the output offset to the input offset is between 2:10 and 7:10, and the ratio of the input offset to the coupling spacing is between 7:10 and 13:10.

17. The transmission mechanism according to claim 16, wherein the progressive gear is a steering gear for a vehicle.

18. The transmission mechanism according to claim 16, wherein, in the course of an entire rotation, the angle between the straight line on which the coupling spacing is located and the straight line on which the output offset is located does not become more acute than 40° or more obtuse than 135°.

19. The transmission mechanism according to claim 1, wherein the ratio of the axial offset to the input offset is between 1.8:10 and 3:10, the ratio of the output offset to the input offset is about 5:10, and the ratio of the input offset to the coupling spacing is about 1:1.

20. The transmission mechanism according to claim 19, wherein the progressive gear is a steering gear for a vehicle.

* * * * *